United States Patent
Moon

[11] Patent Number: 6,086,045
[45] Date of Patent: Jul. 11, 2000

[54] TAP WITH SAFETY MECHANISM

[75] Inventor: Young Mu Moon, Gunpo-si, Rep. of Korea

[73] Assignee: Clover Co., Ltd., Anyang, Rep. of Korea

[21] Appl. No.: 09/084,429

[22] Filed: May 27, 1998

[51] Int. Cl.[7] .................................................. F16K 35/02
[52] U.S. Cl. ........................ 251/335.1; 251/95; 251/109; 251/114; 251/263
[58] Field of Search .................................. 251/95, 335.1, 251/104, 109, 263, 114

[56] References Cited

U.S. PATENT DOCUMENTS

| | | | |
|---|---|---|---|
| 2,639,729 | 5/1953 | Tulumello et al. | 251/107 |
| 2,852,225 | 9/1958 | Klinger | 251/104 |
| 4,018,292 | 4/1977 | Roll et al. | 251/109 |
| 5,470,044 | 11/1995 | Chi | 251/98 |

*Primary Examiner*—A. Michael Chambers
*Attorney, Agent, or Firm*—Jacobson, Price, Holman & Stern, PLLC

[57] ABSTRACT

A tap attached to one end of a water pipe or a connecting pipe of a water dispenser, and controlling the flow of water or liquid by opening and closing an outlet by the operation of a handle actuated by the leverage, the tap including a body having a shaft with a compression spring, connected to a packing used for opening and closing the outlet, and a lid serving to support a support point when turning or, or off the tap; a push handle mounted on the upper portion of the body and having a shaft connecting boss coupled to the front end of the shaft, a downward rotation stopper, an upward rotation stopper, a push portion, and a race formed on its middle; and an auxiliary handle inserted into the race of the push handle and varying the support point of the push handle according to its two-stage operation, thus controlling the opening/closing of the packing with safety.

10 Claims, 4 Drawing Sheets

FIG. 3C
FIG. 3D
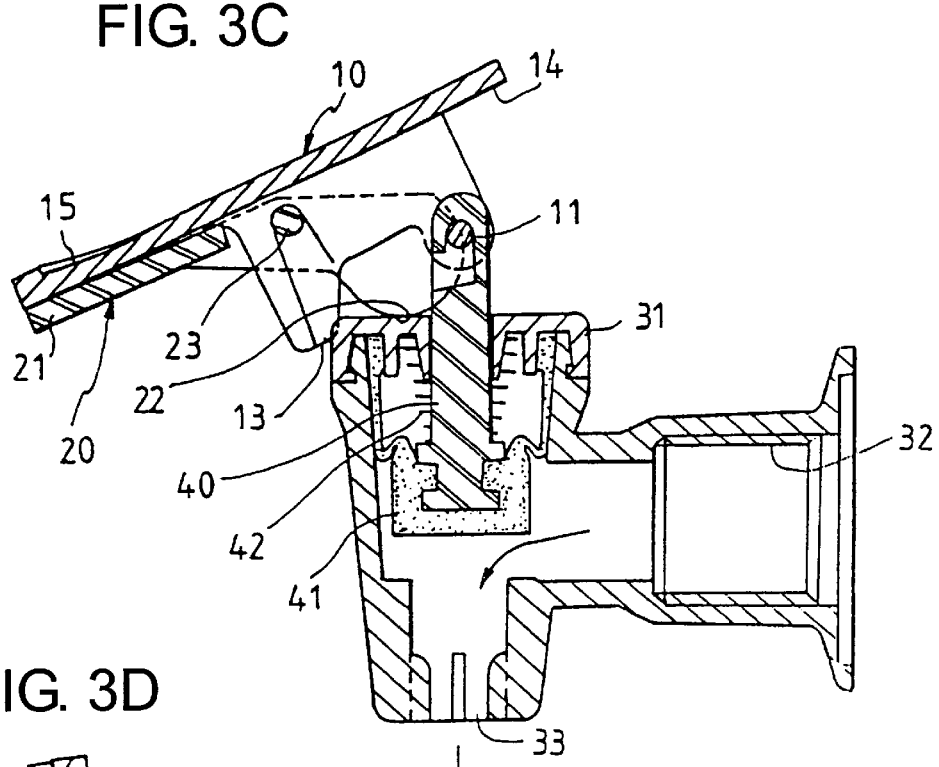
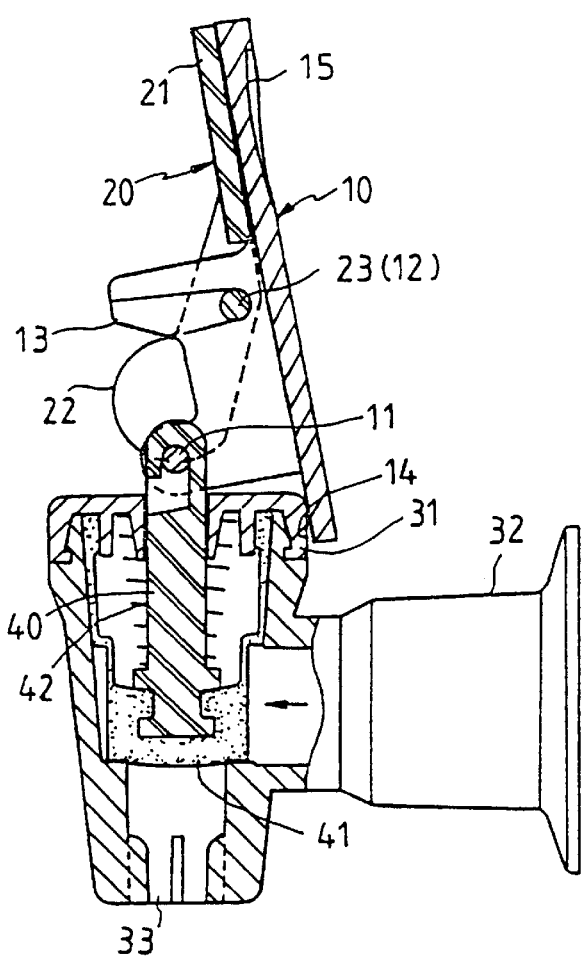

TAP WITH SAFETY MECHANISM

BACKGROUND OF THE INVENTION

1. Field of the Invention

The present invention relates to a tap which discharges water from a water pipe and a water dispenser. More particularly, it relates to a tap which has a safety mechanism to prevent a water leakage due to carelessness.

2. Discussion of Related Art

In a conventional tap, a packing is opened by pressing a handle using the leverage, as shown in FIG. 4, so that the water is output through an outlet.

That is, according to the conventional tap, a handle 1 of the tap is rotated about a support point 3 by pushing it down and a packing, attached to a shaft that is connected to shaft connecting boss 4 and ascending, opens an outlet 2 to discharge water. When letting handle 1 go off, outlet 2 is automatically closed by the elastic force of a compression spring provided to the interior of handle 1.

The conventional tap does not have any safety mechanism, and the handle may be operated by carelessness of children or slight touch to output hot water or other liquids, which is dangerous. That is, in the handle of the conventional tap actuated by the leverage, the force point of the lever corresponds to the support point of the lever, and the water is discharged just by pushing the handle down.

SUMMARY OF THE INVENTION

Accordingly, the present invention is directed to a tap that substantially obviates one or more of the problem due to limitations and disadvantages of the related art.

An object of the present invention is to provide ct tap which has an extra safety mechanism in its operating part and can be used with safety.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a tap attached to one end of a water pipe or a connecting pipe of a water dispenser, and controlling the flow of water or liquid by opening and closing an outlet by the operation of a handle actuated by the leverage, the tap including a body having a shaft with a compression spring, connected to a packing used for opening and closing the outlet, and a lid serving to support a support point when turning on or off the tap; a push handle mounted on the upper portion of the body and having a shaft connecting boss coupled to the front end of the shaft, a downward rotation stopper, an upward rotation stopper, a push portion, and a race formed on its middle; and an auxiliary handle inserted into the race of the push handle and varying the support point of the push handle according to its two-stage operation, thus controlling the opening/closing of the packing with safety.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3C depicts the safety handle when the tap is being turned on;

FIG. 3D depicts the safety handle which turns backward and stops; and

DETAILED DESCRIPTION OF PREFERRED EMBODIMENT

Reference will now be made in detail to the preferred embodiments of the present invention, examples of which are illustrated in the accompanying drawings.

Figure 1:
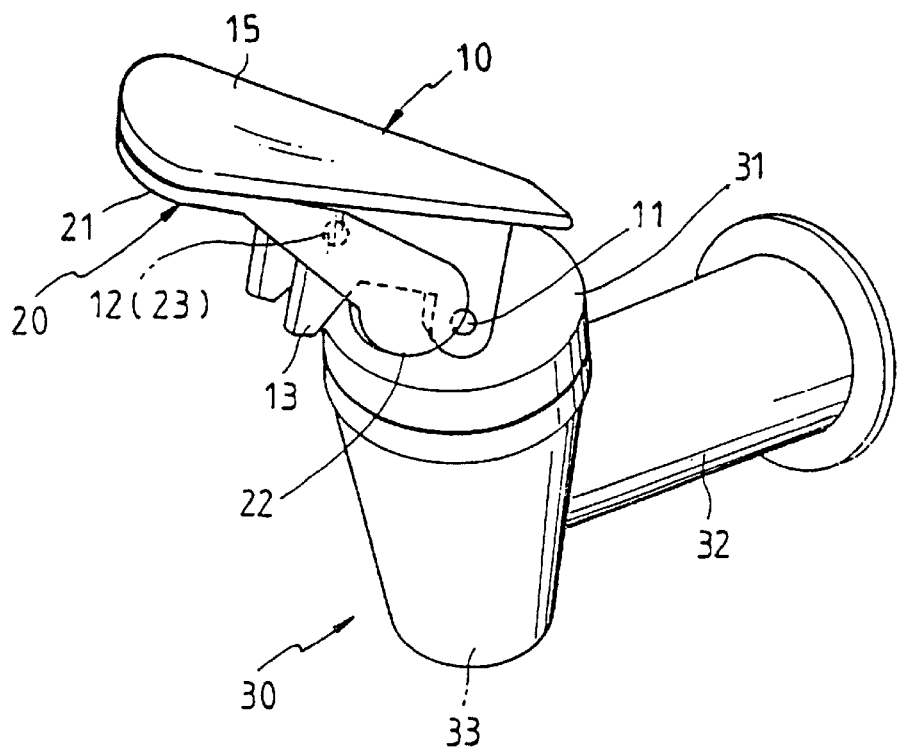
FIG. 1 is a perspective view of the overall structure of a tap in accordance with the present invention.
Figure 4:
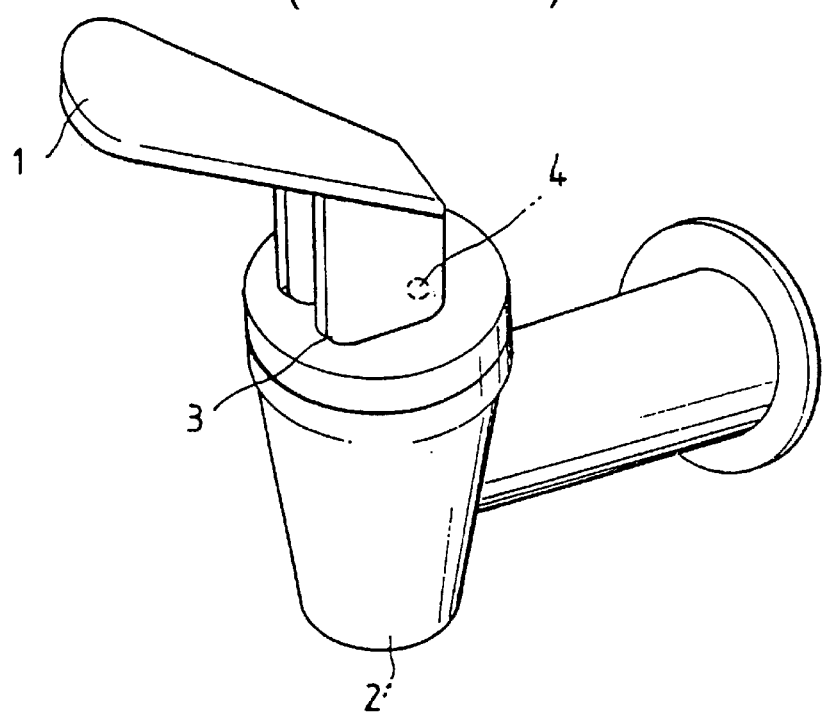
FIG. 4 is a perspective view of a conventional tap.
Figure 2:
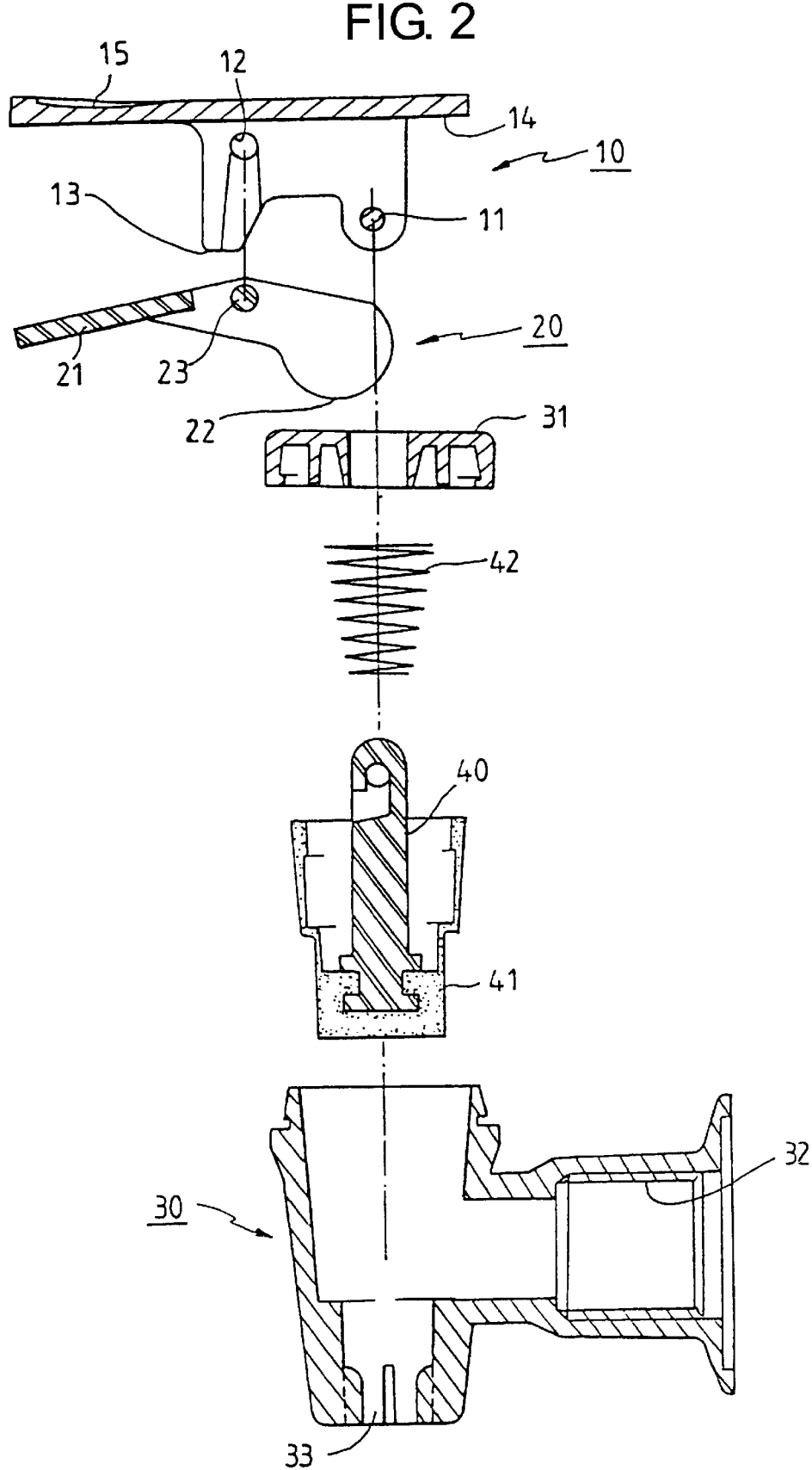
FIG. 2 is an exploded-sectional view of the inventive tap in accordance with the present invention.

FIG. 1 is a perspective view of the overall structure of a tap in accordance with the present invention, and FIG. 2 is an exploded-sectional view of the inventive tap in accordance with the present invention.

As shown in FIG. 1, the tap is attached to the end of a water pipe or a connecting pipe 32 of a water dispenser, and an outlet 33 is opened and closed by the operation of handle 10 actuated by the leverage, through which liquid flows out.

A body 30 of the tap includes a push handle 10 having a force point of the lever and an auxiliary handle 20 joined to handle 10 and operating in two stages and having a support point of the lever.

Body 30 has a shaft 40 with a compression spring 42, which is connected to a packing 41 used for opening and closing outlet 33, and a lid 31 serving to support the support point when turning on or off the tap.

Push handle 10 is installed on the top of body 30, and has a shaft connecting boss 11 coupled to the front end of shaft 40, a downward rotation stopper 13 which prevents an excessive downward rotation, and an upward rotation stopper 14 which prevents an excessive upward rotation. Push handle 10 also has a push portion 15 which corresponds to a force point of the lever and a race 12 formed on its middle for coupling auxiliary handle 20. The feature of the present invention is auxiliary handle 20 which is inserted into central race 12 of push handle 10 and varies the support point of push handle 10 according to its two-stage operation, thus controlling the opening/closing of packing 41 with safety.

A hinge boss 23 fits into central race 12 formed on the middle of push handle 10 so that auxiliary handle 20 is actuated. A circular support wheel 22 is provided to one side of auxiliary handle 20 and a compression portion 21 is provided to its other side. Once holding compression portion 21, support wheel 22 of the other end is changed in position, and supported by the upper portion of lid 31, thus letting push handle 10 go into action.

The following description relates to the advantage and effect of the present invention.

Figure 3A:
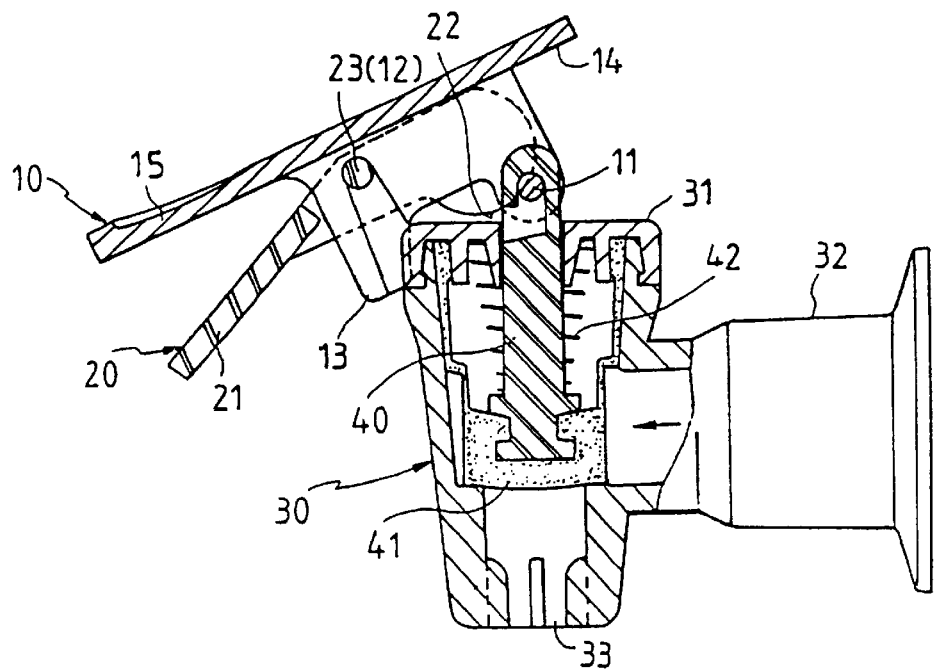
FIG. 3A is a sectional view of a safety handle when the tap is being turned off.

As shown in FIG. 3A, downward rotation stopper 13 of push handle 10 is put on the top of lid 31, and support wheel 22 of auxiliary handle 20 closely contacts the bottom of push handle 10. Thus, support wheel 22 is placed over lid 31 that serves to support. Even if a child pushes two handles 10 and 20 down altogether or one by one, downward rotation stopper 13 comes in contact with lid 31, so the tap is not turned on.

On the contrary, if raising two handles 10 and 20 at the same time or one by one, upward rotation stopper 14 of FIG. 3D contacts lid 31 contacts lid 31 so that handles 10 and 20 stop. At this point, the tap is never turned on.

Figure 3B:
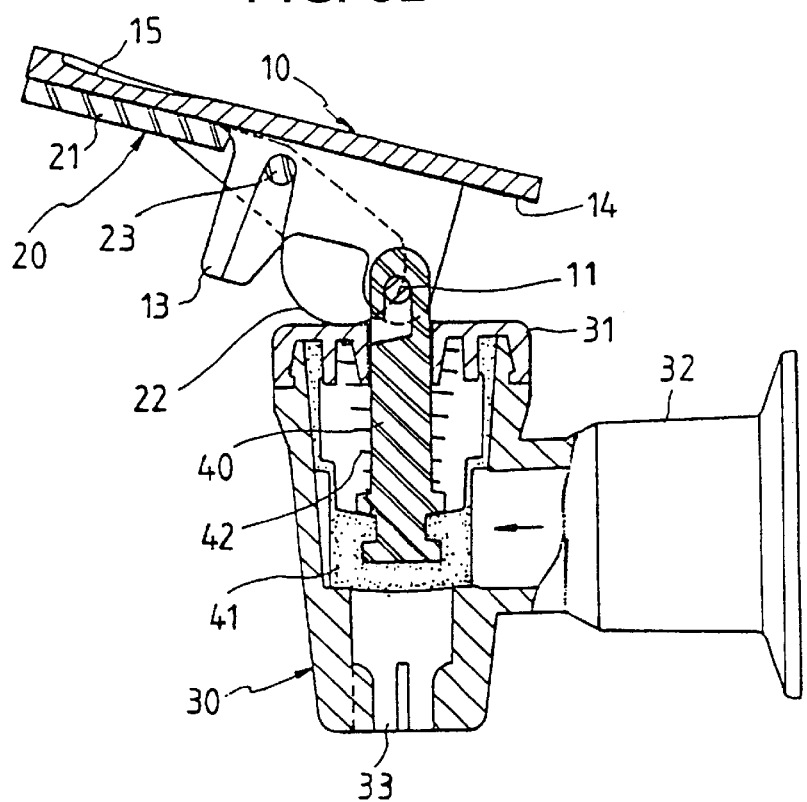
FIG. 3B depicts the combination of the safety handle when turning on the tap.

The only way to turn on the tap is holding push handle 10 and auxiliary handle 20 together and pressing them in the first stage, and simultaneously pushing them down in the second stage, which is depicted in FIGS. 3B and 3C.

As shown in FIG. 3B, when holding push portion 15 of push handle 10 and compression portion 21 of auxiliary handle 20 together in the first stage, hinge boss 23 of auxiliary handle 20 rotates about race 12 and support wheel 22 comes in close contact with the top of lid 31.

Under this state, if pushing push handle 10 and auxiliary handle 20 down at the same time in the second stage, support wheel 22 is supported by the top of lid 31, and packing 41 is moved upward along with shaft 40 by the leverage, thus opening an outlet 33.

After use, when releasing two handles 10 and 20, each of handles 10 and 20 returns to its original state by the elastic force of compression spring 42 provided to shaft 40 so packing 41 closes outlet 32, as shown in FIG. 3A.

When operating push handle 10, support wheel 22 serving as a support point has to go into action by holding auxiliary handle 20 together, which can prevent children from being burnt by hot water and reduce the water consumption.

Downward rotation stopper 13 and upward rotation stopper 14 prevent handles 10 and 20 from being excessively turned so that users can use the inventive tap with safety.

As described above, the tap of the present invention is capable of controlling the flow of water with safety, thus providing a great convenience to users.

It will be apparent to those skilled in the art that various modifications and variations can be made in the tap of the present invention without departing from the spirit or scope of the invention. Thus, it is intended that the present invention cover the modifications and variations of this invention provided they come within the scope of the appended claims and their equivalents.

What is claimed is:

1. A tap attached to one end of a water pipe or a connecting pipe of a water dispenser, for controlling the flow of water or liquid by opening and closing an outlet by the operation of a handle actuated by leverage, the tap comprising:

a body having a shaft with a compression spring, connected to a packing used for opening and closing the outlet, and a lid serving to support a support point when turning on or off the tap;

a push handle mounted on an upper portion of the body and having a shaft connecting boss coupled to a front end of the shaft, a downward rotation stopper, an upward rotation stopper, a push portion, and a race formed on its middle; and an auxiliary handle, actuated by a hinge boss that fits into the race formed at the middle of the push handle, for varying the support point of the push handle according to its two-stage operation, a circular support wheel provided to one side of the auxiliary handle and a compression portion provided to its other side, such that pivoting of the compression portion toward an underside of the push handle chances a position of the support wheel so as to place the support point of the push handle on an upper portion of the lid and allow opening of the packing with safety.

2. The tap as set forth in claim 1, wherein downward movement of both the push handle and the auxiliary handle does not activate liquid flow unless the auxiliary handle has first been pressed upward to be in close proximity with the underside of the push handle.

3. The tap as set forth in claim 1, wherein operation of a coupling between said hinge boss and said race is limited to rotary motion.

4. A tap attached to one end of a connecting pipe of a fluid dispenser, for safely controlling the flow of liquid by opening and closing an outlet through operation of a handle actuated by leverage, the tap comprising:

a body having a shaft with a compression spring, connected to a packing used for opening and closing the outlet, and a lid serving to provide a support point when using the tap to control the flow of liquid;

a push handle mounted on an upper portion of the body and having a shaft connecting boss coupled to a front end of the shaft, said push handle having a push portion, and a race formed on a lower side of the push handle near its middle; and an auxiliary handle, pivotally coupled to an underside of said push handle by a hinge boss that fits into the race formed at the middle of the push handle, said auxiliary handle including a circular support wheel provided on a side nearest the shaft connecting boss and a compression portion provided on an opposite side and underlying the push portion of said push handle, said auxiliary handle varying the support point of the push handle according to its two-stage operation such that, in an absence of upward force on said auxiliary handle, downward movement of said push handle does not activate the tap to allow liquid flow while, in response to upward force on said auxiliary handle moving the compression portion into close proximity with the underside of the push handle, a position of the support wheel is changed so as to place the support wheel, which acts as the support point for the push handle, on an upper portion of the lid such that, responsive to subsequent downward force on said push handle, the support point acts as a fulcrum, translating downward movement of the push handle to upward movement of the shaft, opening the packing and allowing liquid flow.

5. The tap as set forth in claim 4, said push handle further comprising a downward rotation stopper and an upward rotation stopper.

6. The tap as set forth in claim 4, wherein downward movement of both the push handle and the auxiliary handle does not activate liquid flow without previous upward movement of the auxiliary handle.

7. The tap as set forth in claim 4, wherein operation of a coupling between said hinge boss and said race is limited to rotary motion.

8. A tap attached to one end of a connecting pipe of a fluid dispenser, for safely controlling the flow of liquid by opening and closing an outlet through operation of a handle actuated by leverage, the tap comprising:

a body having a shaft with a compression spring, connected to a packing used for opening and closing the outlet, and a lid serving to provide a support point when using the tap to control the flow of liquid;

a push handle mounted on an upper portion of the body and having a shaft connecting boss coupled to a front end of the shaft, said push handle having,
   a downward rotation stopper;
   a push portion; and
   a race formed on a lower side of the push handle near its middle; and
an auxiliary handle, pivotally coupled to an underside of said push handle by a hinge boss that fits into the race formed at the middle of the push handle, said auxiliary handle including a circular support wheel provided on a side nearest the shaft connecting boss and a compression portion provided on an opposite side and underlying the push portion of said push handle, said auxiliary handle varying the support point of the push handle according to its two-stage operation such that, in an absence of upward force on said auxiliary handle, said support wheel does not engage the lid and thus downward movement of said push handle does not lift the packing to allow liquid flow, with excessive downward rotation of said push handle being prevented by said downward rotation stopper, and wherein, when upward force is applied to said auxiliary handle to move the compression portion into close proximity with the underside of the push handle, the support wheel is pivotally brought into contact with an upper portion of the lid to thereby provide the support point for the push handle such that, responsive to downward force on said push handle while said auxiliary handle is held in close proximity with the underside of the push handle, the support point acts as a fulcrum, translating downward movement of the push handle to upward movement of the shaft, opening the packing and allowing liquid flow.

9. The tap as set forth in claim 8, said push handle further comprising an upward rotation stopper.

10. The tap as set forth in claim 8, wherein operation of a coupling between said hinge boss and said race is limited to rotary motion.

* * * * *